United States Patent [19]
Yamamoto et al.

[11] Patent Number: 5,325,683
[45] Date of Patent: Jul. 5, 1994

[54] HEAT PUMP APPARATUS

[75] Inventors: Yoshiaki Yamamoto, Katano; Shinji Omura, Kadoma; Hisaaki Gyoten, Neyagawa; Yasushi Nakagiri, Osaka, all of Japan

[73] Assignee: Matsushita Electric Industrial Co., Ltd., Osaka, Japan

[21] Appl. No.: 33,253

[22] Filed: Mar. 16, 1993

[30] Foreign Application Priority Data

Mar. 16, 1992 [JP] Japan .................. 4-058246

[51] Int. Cl.$^5$ ........................... F25B 19/00
[52] U.S. Cl. ........................... 62/476; 62/487; 62/526
[58] Field of Search .......... 62/476, 486, 487, 515, 62/524, 525, 526

[56] References Cited

U.S. PATENT DOCUMENTS

| 2,267,152 | 12/1941 | Gygax | 62/524 |
| 3,990,263 | 11/1976 | Ainbinder et al. | 62/476 |
| 4,285,209 | 8/1991 | Luthi et al. | |
| 4,285,211 | 8/1981 | Clark | |
| 4,379,486 | 4/1983 | Kurihara | 165/153 |
| 5,048,308 | 9/1991 | Hisajima et al. | 62/476 |

Primary Examiner—Henry A. Bennett
Assistant Examiner—William C. Doerrler
Attorney, Agent, or Firm—Ratner & Prestia

[57] ABSTRACT

An absorption heat pump apparatus using a refrigerant as a heat exchanging medium includes a vapor generator for producing a dilute refrigerant solution and a heat exchanger having an evaporator for producing evaporated refrigerant gas and an absorber for making the evaporated refrigerant gas to be absorbed into the dilute refrigerant solution. A plurality refrigerant paths extending inside the evaporator and absorber for flowing the refrigerant inside for heat exchange operation. Each inlet end of refrigerant paths is connected to an inlet before the evaporator by a plurality of first capillary paths. Each outlet end of refrigerant paths is joined to an outlet. A plurality of second capillary paths are connected to the refrigerant paths before the absorber for supplying the dilute refrigerant solution to the absorber. When passing through the capillary paths, the refrigerant is cooled due to the pressure loss.

6 Claims, 5 Drawing Sheets

HEAT PUMP APPARATUS

BACKGROUND OF THE INVENTION

1. Field of the Invention

The present invention relates to a heat pump apparatus using gas or solar heat as the heat source to obtain a chilled water or cooling air and, more particularly, to an absorption heat pump using a medium that operates primarily at atmospheric pressure or above.

2. Description of the Prior Art

In FIG. 6, an example of conventional absorption heat pump apparatus 200 is shown. The rich solution, with a high refrigerant concentration, which is pressurized by the solution pump 201 recovers the absorption heat from the heat absorber 202, and then the solution temperature rises. At the solution heat exchanger 203, the temperature of the concentrated rich solution further rises by the sensible heat of the poor solution, which is low refrigerant concentration flowing from the rectifier 205. The rich solution then flows into the generator 204, and is externally heated.

The rich solution thus heated through the absorber 202, solution heat exchanger 203, and generator 204 produces refrigerant vapor at the generator 204. The rich solution in vapor-liquid two phase state flows into the rectifier 205. The rectifier 205 separates the vapor and liquid, outputs the refrigerant vapor to the condenser 206, and returns the poor solution having a reduced refrigerant content to the solution heat exchanger 203. The function of the rectifier 205 is to liquefy the vapor of the medium contained in the refrigerant vapor to supply high purity refrigerant vapor to the condenser 206.

As described above, the sensible heat extracted from the poor solution flowing out from the rectifier 205 is applied to the rich solution, thus lowering the temperature of the poor solution supplied to the absorber 202. The high purity refrigerant vapor produced by the rectifier 205 flows out to the condenser 206, and the heat is externally discharged to liquefy the vapor. Thereafter, the pressure is reduced by the expansion valve 207, cooling the fluid which then flows into the evaporator 208. The evaporator 208 takes heat from the outside of the heat pump system to evaporate the solution, and returns the poor solution to the absorber 2.

In general, a pre-cooler 209 is provided in the solution paths between the condenser 206 and the expansion valve and between the evaporator 208 and the absorber 202. The pre-cooler 209 exchanges heat between the low temperature refrigerant vapor from the evaporator 208 and the high temperature fluid refrigerant from the condenser 206 in order to increase the cooling effect of the evaporator 208. The refrigerant vapor that passes the pre-cooler 209 returns to the absorber 202. In the absorber 202, the refrigerant vapor is absorbed into the poor solution returning from the solution heat exchanger 203, part of the absorption heat generated in this process is applied to the rich solution, and the remaining heat is vented outside the system. With the absorption heat pump apparatus thus described, the cold heat of the evaporator 208 is used for both cooling and freezing, and the waste heat of the condenser 206 and absorber 202 is used for heating or hot water supply.

When the pressure differential between the evaporator 208 and absorber 202 becomes great in an absorption heat pump apparatus, the temperature of the absorber 202 must be lowered even more to obtain the same evaporation temperature. As a result, it is necessary to reduce the pressure loss of the evaporator 208 and absorber 202, and in general the evaporator 208, pre-cooler 209, and absorber 202 are constructed with plural parallel refrigerant flow lines as shown by the dotted lines in the figure.

However, in a conventional absorption heat pump apparatus thus comprised, the refrigerant branching into each of the parallel refrigerant flow lines is not even, and particularly in the absorber 202 branching of the refrigerant vapor and the poor solution flowing from the solution heat exchanger 203 is important, it is extremely difficult to assure uniform branching of both, and the characteristics of each heat exchanger cannot be effectively used, reducing capacity and efficiency.

SUMMARY OF THE INVENTION

The object of the present invention is therefore to provide an imaging device which solves these problems.

The present invention has been developed with a view to substantially solving the above described disadvantages and has for its essential object to provide an improved heat pump apparatus.

In order to achieve the aforementioned objective, a heat pump apparatus using a refrigerant as a heat exchanging medium comprises refrigerant solution means for producing a poor solution of said refrigerant; and heat exchange means. The heat exchange means comprises evaporation means for evaporating said refrigerant to produce a refrigerant vapor thereof; first refrigerant path means provided inside said evaporating means passing therethrough, said first refrigerant path means having an inlet for taking said refrigerant and a predetermined number of first refrigerant paths which are branched from said inlet and extending out said evaporation means for carrying said taken refrigerant and said refrigerant vapor therethrough, absorption means for making said refrigerant vapor be absorbed into said poor solution; and second refrigerant path means provided inside said absorption means passing therethrough, said second refrigerant path means having said predetermined number of second refrigerant path including first ends each connected to non-branched end of said first refrigerant paths for taking said refrigerant vapor into said absorption means and second ends, and said second refrigerant paths further including an outlet joining said second ends of second refrigerant paths for carrying said refrigerant vapor absorbed poor solution therefrom.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1:
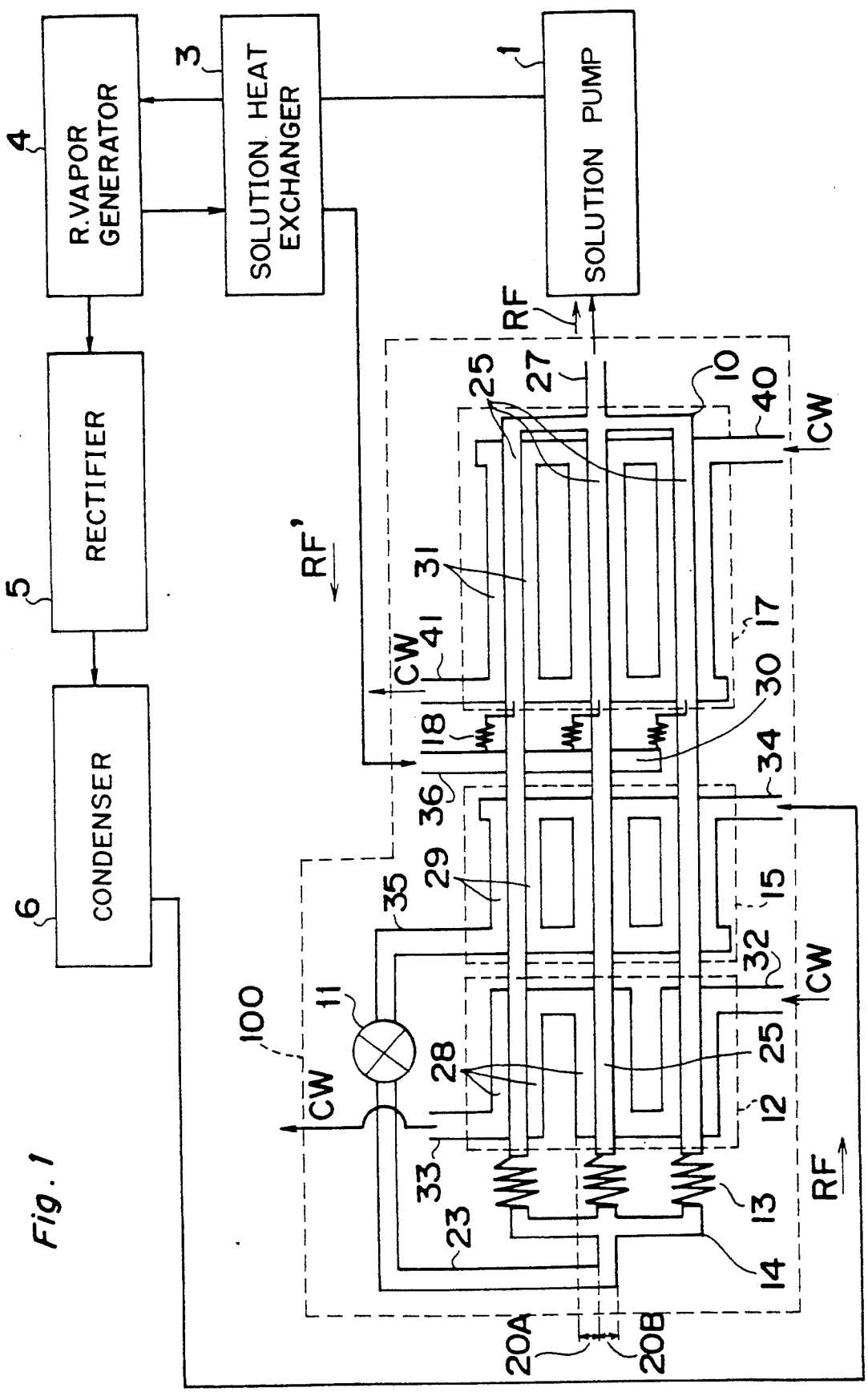
FIG. 1 is a block diagram showing a heat pump apparatus according to a preferred embodiment of the present invention.

Referring to FIG. 1, a heat pump apparatus according to a preferred embodiment of the present invention is shown. The heat pump apparatus comprises a heat exchanger unit 100, a solution pump 1, a solution heat exchanger 3, a refrigerant vapor generator 4, a rectifier 5, and a condenser 6 connected to each other, as shown.

The heat exchanger unit 100 comprises a plurality of elongated refrigerant paths 25 for carrying the refrigerant fluid RF. The heat exchanger unit 100 further comprises a chilled water path 28 for carrying chilled water CW, and a high pressure refrigerant path 29 carrying high pressure refrigerant RF, and a chilled water path 31 carrying chilled water CW, each of which connects around the left side, the middle, and right side portions of refrigerant paths 25, respectively, as best shown in FIG. 1. Thus, the chilled water path 28, high pressure refrigerant path 29, and chilled water path 31 construct and function as an evaporator 12, a pre-cooler 15, and a absorber 17 together with the refrigerant paths 25.

The heat exchanger unit 100 includes an expansion valve 11 for depressurizing the fluid refrigerant liquefied by the condenser 6 and passed through the pre-cooler 15. A refrigerant inlet path 23 is connected to the expansion valve 11 for supplying the depressurized refrigerant Rf to the refrigerant paths 25. The refrigerant inlet path 23 is branched at the inlet side of the evaporator 12 to have a plurality of (three in this embodiment) branching paths 14. The branching paths 14 are connected to a plurality of (three in this figure) first capillary tubes 13 for refrigerant branching. These capillary tubes 13 are each connected to the refrigerant paths 25 through which the refrigerant RF flows. The refrigerant paths 25 pass through the evaporator 12, pre-cooler 15, and absorber 17, and merge at the outlet side of the absorber 17. In addition, to flow the poor solution RF', which is dilute refringent fluid, returned from the fluid heat exchanger 3 into the refrigerant flow paths 25 located on the inlet side of the absorber 17 through a poor solution inlet 36, a plurality of (three in this figure) second capillary tubes 18 are connected between a poor solution branching path 30 and the refrigerant paths 25 of the absorber 17.

In the refrigerant paths 25 respectively located on the evaporator 12, pre-cooler 15, absorber 17 form first, second, and third refrigerant paths, respectively. In addition, the fist capillary tubes 13 form the capillary paths for refrigerant branching, and the second capillary tubes 18 form the capillary paths for poor solution branching.

In operation, the high pressure refrigerant RF from the condenser 6 enters into the high pressure refrigerant path 29 of the pre-cooler 15 through a high pressure refrigerant inlet 34, circulates therein to heat the refrigerant RF flowing in the refrigerant paths 25 thereat, and then goes out from the refrigerant outlet 35 to the expansion valve 11. The high pressure refrigerant RF is depressurized by the expansion valve 11 and supplied to the evaporator 12 through the refrigerant inlet path 23, branching paths 14 and capillary tubes 13, and is further depressurized by the capillary tubes 13.

The pressure loss at the capillary tubes 13 for refrigerant branching is designed to be significantly greater than the pressure loss at the evaporator 12 positioned downstream, and the refrigerant RF is therefore branched according to the degree of the pressure loss at the three capillary tubes 13 for refrigerant branching without being affected by the operation downstream. Because the three capillary tubes 13 are all shaped identically, the refrigerant flow RF is divided into three equal parts flowing into the refrigerant paths 25 of the evaporator 12. The refrigerant RF is heated by chilled water CW and vaporizes in the evaporator 12 (conversely, the chilled water CW is cooled). The vaporized refrigerant RF then flows into the pre-cooler 15, exchanges heat with the fluid-state high pressure refrigerant RF from the condenser 6, and is further heated.

Because the pre-cooler 15 improves the degree of subcooling of the high pressure refrigerant RF in the high pressure refrigerant path 29 using a low temperature refrigerant RF flowing in the refrigerant paths 25 and improves the amount of cold heat obtained by the evaporator 12. Thus, the capacity of the heat exchanger unit 100 can be increased. In addition, there are also cases, dependent upon the operating conditions, in which the refrigerant RF is not completely vaporized at the outlet of the evaporator 12 and contains part fluid, and in this case uneven refrigerant branching occurs with methods which rebranch as in the prior art. However, the refrigerant RF flows evenly in the present invention because there is no merging or branching between the evaporator 12 and the pre-cooler 15.

The refrigerant RF heated in the pre-cooler 15 flows into the absorber 17 in a heated vapor state. The poor solution RF' with a low refrigerant vapor concentration from the capillary tubes 18 flows into the refrigerant paths 25 and merges with the refrigerant vapor, and warms. The poor solution RF' is distributed evenly by the capillary tubes 18 for poor solution branching to the three refrigerant paths 25 due to the same branching principle of the refrigerant, as described above. In addition, the refrigerant vapor RF also flows evenly because there is no merging or branching in the flow from the pre-cooler 15 to the absorber 17. In the absorber 17, heat is discharged to the water coolant CW while absorbing refrigerant vapor RF, resulting at the absorber 17 outlet in a completely fluid-state concentrated fluid flowing to the solution pump 1.

As described above, because the inlet to the evaporator 12 is also a depressurization zone due to the expansion valve 11, there is no affect on the cycle characteristics even when pressure loss due to the capillary tubes 13 for refrigerant branching is great, and the refrigerant can be appropriately branched using the capillary tubes 13. Therefore, because the refrigerant RF is branched at the inlet of evaporator 12, and is not branched at the pre-cooler 15 or absorber 17 provided downstream, the refrigerant RF continues to flow evenly. Furthermore, because paths for branching are not required at the pre-cooler 15 and absorber 17, pressure loss at those points is reduced, the characteristics of the evaporator 12, pre-cooler 15, and absorber 17 function effectively, and a high capacity, high efficiency absorption heat pump apparatus can be achieved.

It is to be noted that in the above embodiment there are three refrigerant paths 25, which are the flow paths for the refrigerant RF, but the number of paths shall not be so limited.

Furthermore, the above embodiment was described for a water-cooled system, but the invention shall not be so limited and an air-cooled system, for example, can also be used.

In addition, the above embodiment was described with the evaporator 12, pre-cooler 15, and absorber 17 separately constructed, but the invention shall not be so limited and part or all of these may be formed by a layer-built heat exchanger, and an integrated construction can also be used.

In addition, in the above embodiment the refrigerant paths 25 pass through the evaporator 12, pre-cooler 15, and absorber 17, but the invention shall not be so limited and it is also possible to pass the refrigerant paths 25 through only the evaporator 12 and the pre-cooler 15.

In addition, in the above embodiment the capillary paths 13 are connected to the refrigerant paths 25 at the evaporator inlet, but the invention shall not be so limited and these are can be replaced by any other means which enables the even branching of refrigerant vapor.

In addition, in this embodiment, fluid capillaries 18 are inserted in the refrigerant paths 25 to distribute the poor solution RF' therein, but the invention shall not be so limited and these can be replaced by any other means which enables the even branching of the poor solution RF'.

In addition, the above embodiment was described for a heat pump apparatus comprising the pre-cooler 15, but the invention shall not be so limited and the pre-cooler 15 can be replaced by the evaporator and absorber which are connected by means of plural refrigerant flow paths.

With reference to FIGS. 2, 3, 4, and 5, an alternation of the heat exchanger unit 100 according to the present invention is described herebelow. The heat exchanger unit 100 is formed in a layer-built configuration comprised by plural plate components.

Figure 2:
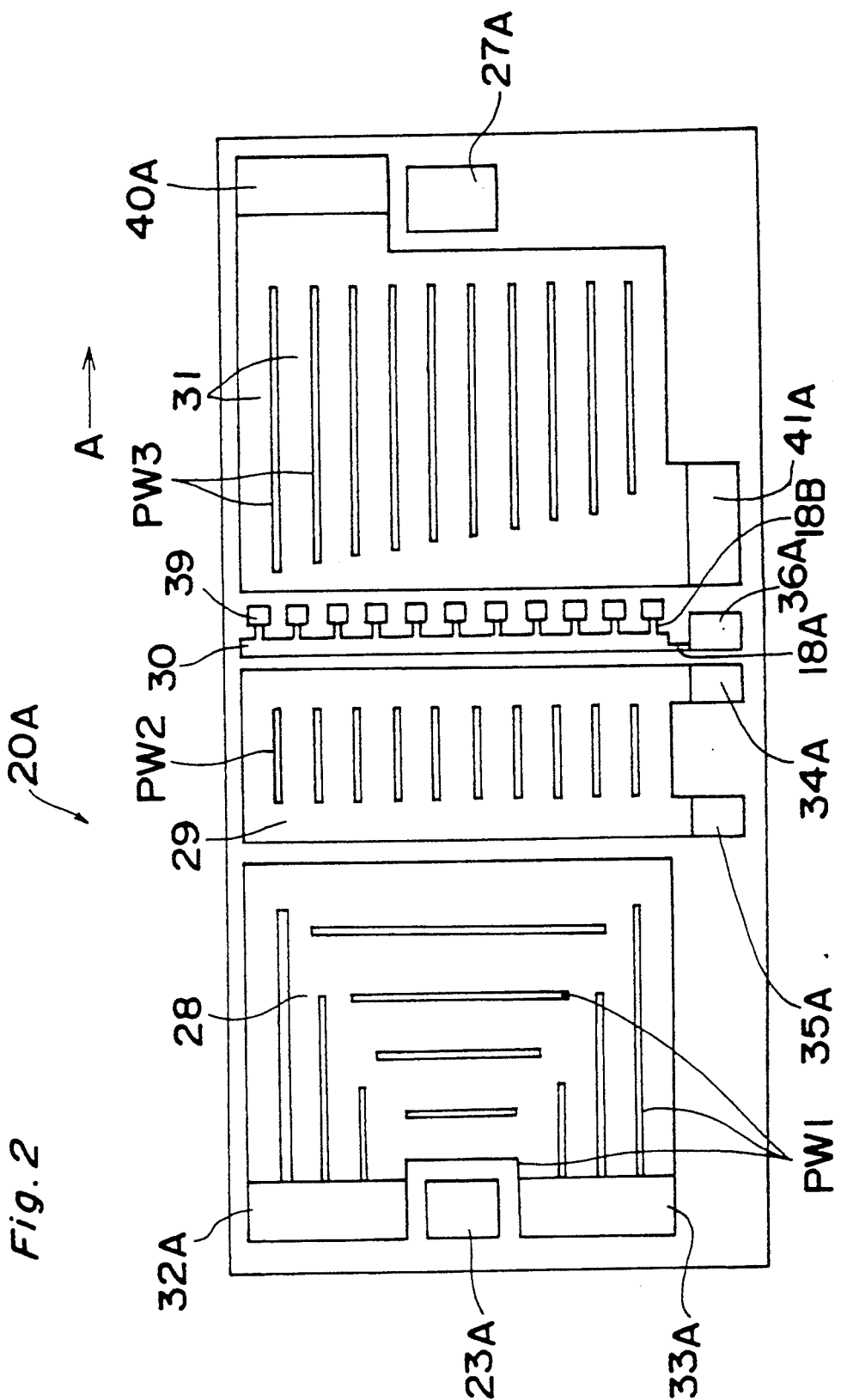
FIG. 2 is a plane view showing a plate component, having refrigerant and fluid flow paths, of a layer built heat exchanger used in a heat pump apparatus according to the present invention.
Figure 3:
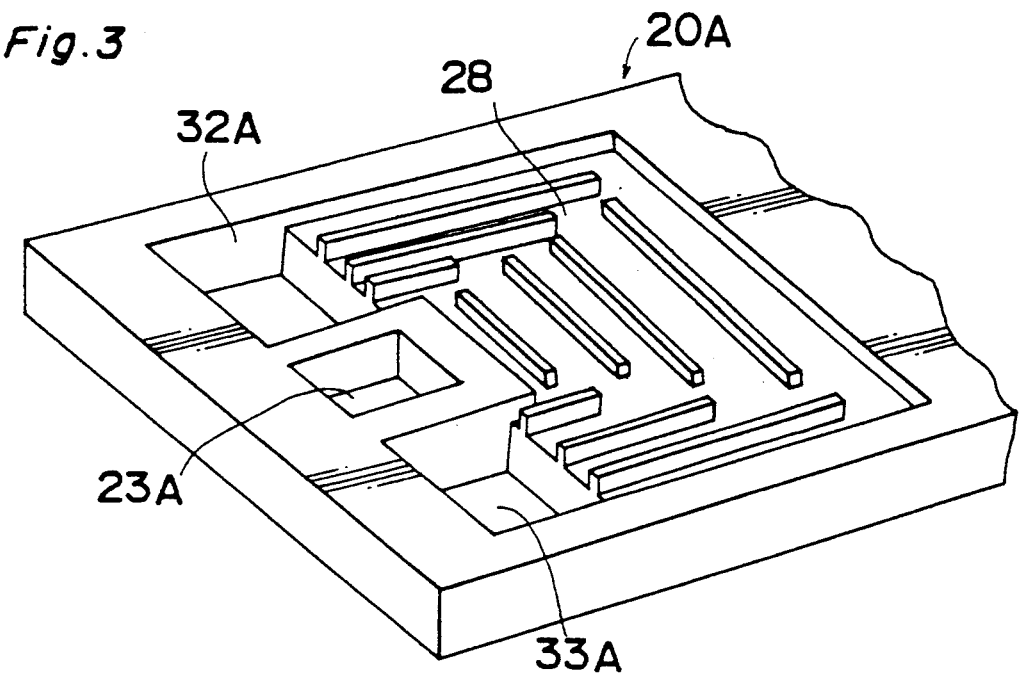
FIG. 3 is a fragmental perspective view showing the plate component shown in FIG. 2.

Referring to FIGS. 2 and 3, an elongated cooling path plate 20A carrying the high pressure refrigerant RF and chilled water CW is shown. The cooling path plate 20A mainly comprises four areas: the first chilled water path area 28, high pressure refrigerant path area 29, poor solution branching path area 30, and the second chilled water path area 31 formed in the top surface thereof, as shown in order from the left side of FIG. 2.

Furthermore, a first chilled water inlet 32A and a first chilled water outlet 33A both for the first cooling water CW is formed in rectangular shaped through holes on the opposite positions adjacent to the left side edge of the chilled water path area 28. The two through holes 32A and 33A are connected with the chilled water path area 28 at the right side edges thereof. Between the through holes 32A and 33A and apart from the left side edge of the chilled water path area 28, a first refrigerant inlet 23A in a rectangular shaped through hole is formed. The first refrigerant inlet 23A is isolated from the through holes 32A and 33A and the chilled water path area 28.

The chilled water path area 28 is sunk from the top surface of the cooling path plate 20A by a predetermined length to form a rectangular shaped recess therein. On the bottom of the recess, provided are three groups of first partition walls PW1 which are raised therefrom to the position aligned with the top surface of the cooling path plate 20A. First and second groups of partition walls PW1 (three each in this embodiment) having different lengths extend from the right side edges of the through holes 32A and 33A, respectively, along the longitudinal direction A of the plate 20A.

The partition walls PW1 become shorter as they are located near the first refrigerant inlet 23A (from which the low pressure refrigerant enters). Between first and second partition walls PW1, third group of partition walls PW1 (four in this embodiment) having different lengths extend such that the third group of partition walls PW1 become shorter as they are located near the left side edge of the first chilled water path area 28. Thus, the path for leading the chilled water CW from the first inlet 32A to the first outlet 33A are formed, as best shown in FIG. 3.

Similarly, the high pressure refrigerant path area 29 is formed in a generally rectangular shaped recess. A plurality of (ten in this embodiment) second partition walls PW2 are provided on the middle portion of the recess bottom and are extending along the direction A to have space therearound.

A first high pressure refrigerant outlet 35A and a high pressure refrigerant inlet 34A both for the high pressure refrigerant RF in rectangular shaped through holes are formed on the opposite positions adjacent to the lower side edge of the high pressure refrigerant path area 29. The two through holes 35A and 34A are connected with the high pressure refrigerant path area 29, thus, the paths for leading the high pressure refrigerant RF from the first refrigerant inlet 34A to the first refringent outlet 35A are formed.

The poor solution branching path area 30 is formed in an elongated rectangular recess having a first capillary area 18A formed at the lower side edge thereof and a plurality (eleven in this embodiment) of second capillary areas 18B formed at the right side edge thereof. At the lower side edge of the first capillary area 18A, a first poor solution inlet 36A formed in a rectangular shaped through hole is provided. At the right side edges of each second capillary area 18B, a connection hole 39 formed in a rectangular shaped through hole are provided. Thus, the paths for leading the poor solution RF' from the first poor solution inlet 36A to the connecting holes 39 through the first capillary area 18A, the poor solution branching path 30, and the second capillary area 18B are formed.

The second cooling water path area 31 is formed in a generally rectangular shaped recess. A plurality of (ten in this embodiment) third partition walls PW3 having different lengths are provided on the middle portion to form a space therearound. The third partition walls PW3 extend along the direction A such that the right ends thereof are aligned in a direction perpendicular to the direction A. The distance between the left ends of partition walls PW3 and the left side edge of the cooling water path area 31 becomes greater as the third partition wall PW3 are located near the lower side edge of the second cooling water path area 31.

A second chilled water outlet 41A and a second chilled water inlet 40A both for the chilled water CW formed in rectangular shaped through holes are provided at the upper-right edge portion and lower-left edge portion of the cooling water path area 31, respectively. Under the second chilled water inlet 40A, a first refrigerant outlet 27A in a rectangular shaped through hole is formed and is isolated therefrom. Thus, the paths for leading the chilled water CW coming from the second chilled water inlet 40A to the second chilled water outlet 41A are formed. Since the left side ends of the third partition walls PW are set back to the right side as they are located near the outlet 41A, the cooling water CW can smoothly flows toward the outlet 41A.

Figure 4:
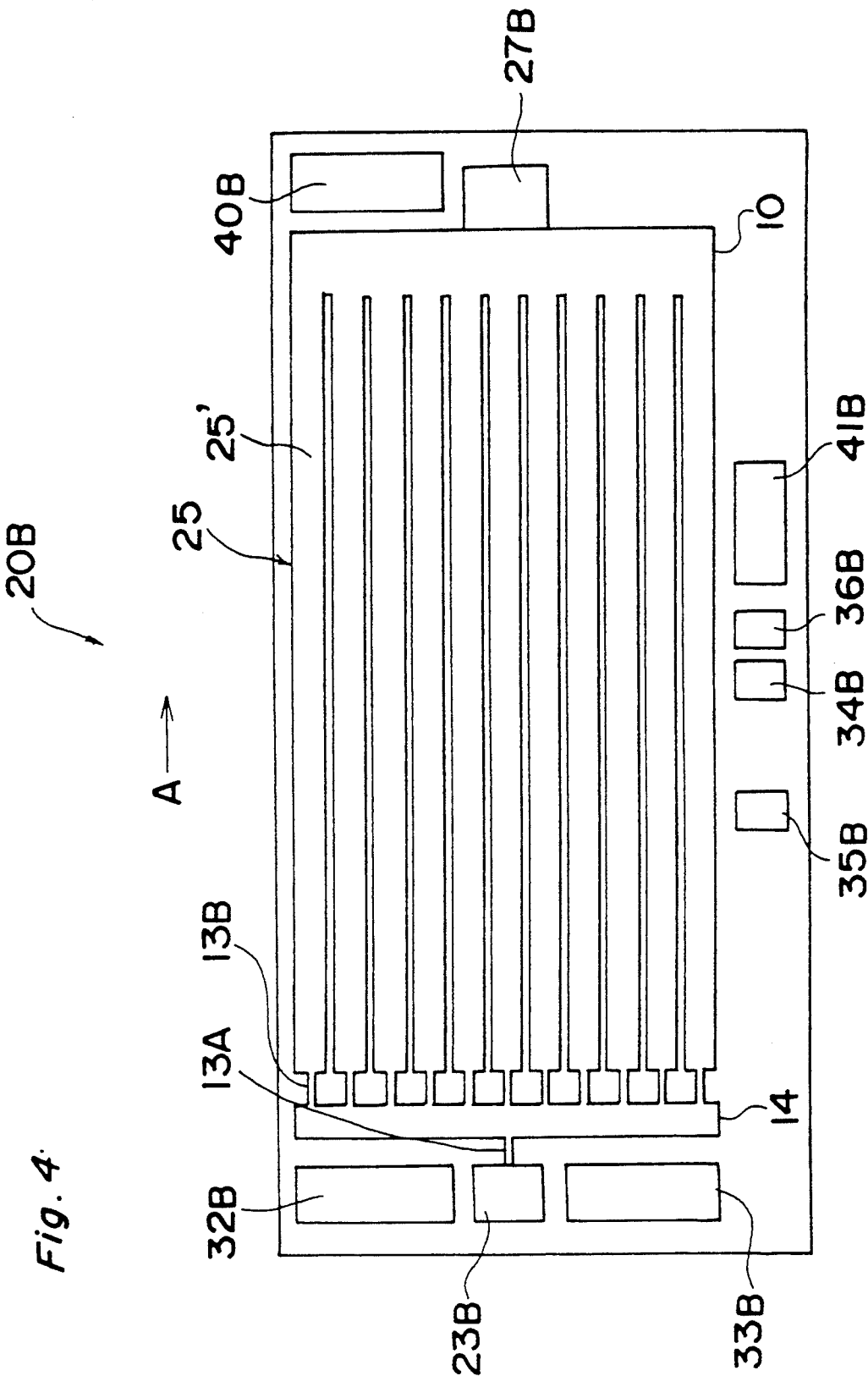
FIG. 4 is a plane view showing another plate component having refrigerant solution paths used together with the plate component showing in FIG. 2.
Figure 6:
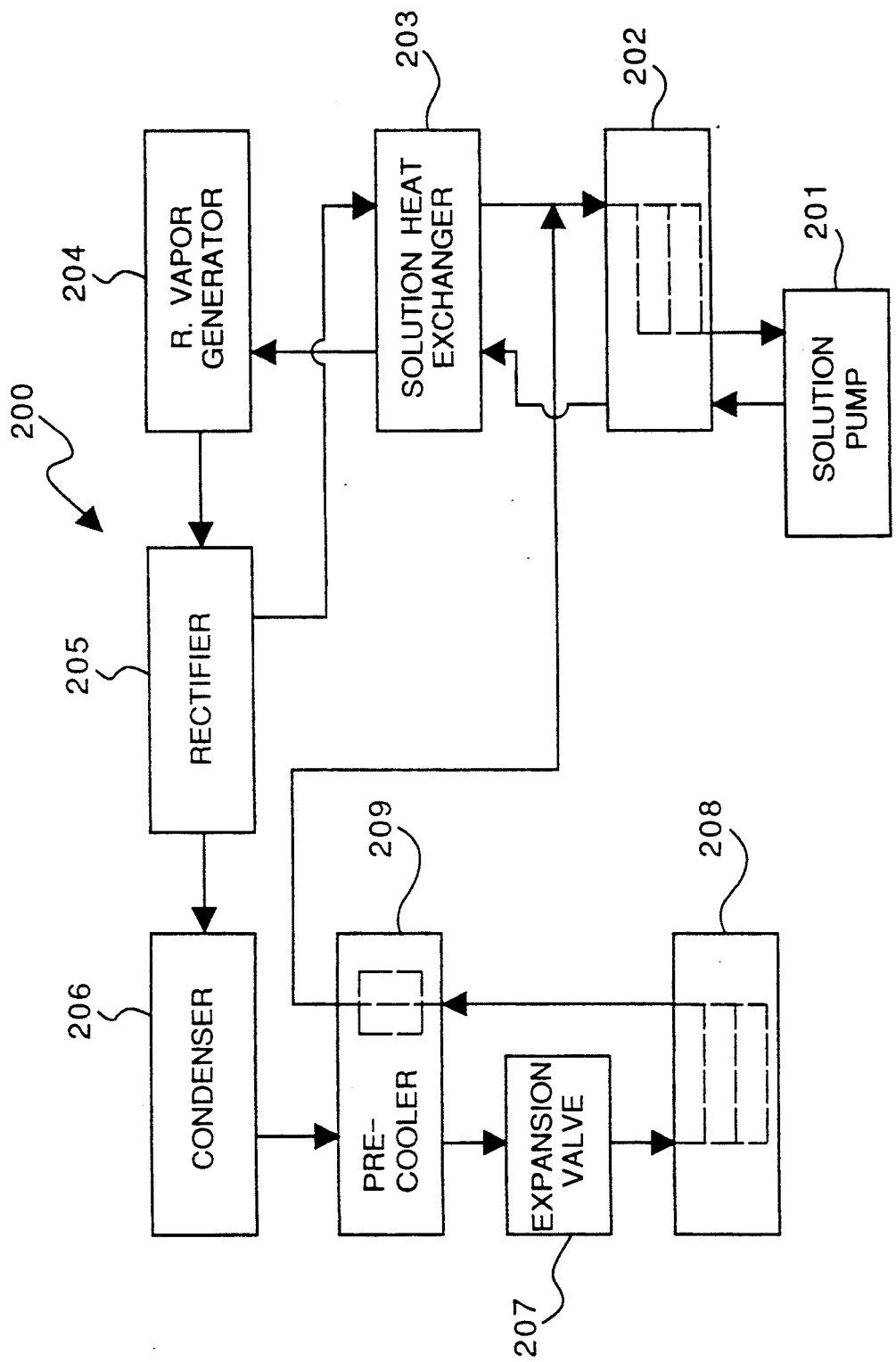
FIG. 6 is a block diagram showing a conventional heat pump apparatus.

Referring to FIG. 4, an elongated absorption fluid path plate 20B carrying the refrigerant RF and absorbed solution is shown. The absorption solution path plate 20B has the same size as the cooling path plate 20A and mainly comprises the refrigerant path area 25 sunk from the top surface of the absorption solution path plate 20B by a predetermined length to form an widely elongated recess. The absorption solution path plate 20B further comprises a second refrigerant inlet 23B, a second refrigerant (rich solution) outlet 27B, a third chilled water inlet 32B, a third chilled water outlet 33B, a second refrigerant (high pressure) outlet 35B, a second refrigerant inlet 34B, a second poor solution inlet 36B, a fourth chilled water inlet 40B, and a fourth chilled water outlet 41B, those are formed in the identical positions and shapes to the refrigerant inlet 23A, refrigerant outlet 27A, chilled water inlet 32A, chilled water outlet 33A, refringent outlet 35A, refrigerant inlet 34A, poor solution inlet 36A, water inlet 40A, and water outlet 41A of the cooling path plate 20A.

The refrigerant path area 25 includes a plurality of (eleven in this embodiment) refrigerant paths 25' extending in the longitudinal direction A of the plate 20B and an outlet branching path area 10 formed on the right side thereof to connect each of the refrigerant paths 25'. The outlet branching path area 10 is connected with the fourth fluid outlet 27B.

Near the left side end of the refrigerant path area 25', the branching path area 14 shaped in an elongated rectangular recess is formed. The branching path area 14 has a third capillary area 13A formed at the left side edge thereof and a plurality (eleven in this embodiment) of fourth capillary areas 13B formed at the right side edge thereof. Each fourth capillary area 13B connects with the refrigerant path 25', and the third capillary area 13A connects with the second refrigerant inlet 23B.

It is to be noted that the cooling path plate 20A and the absorption solution path plate 20B provide the constructions and functions of the portions 20A and 20B, indicated by the dot line, of the heat exchanger 100 shown in FIG. 1.

Figure 5:
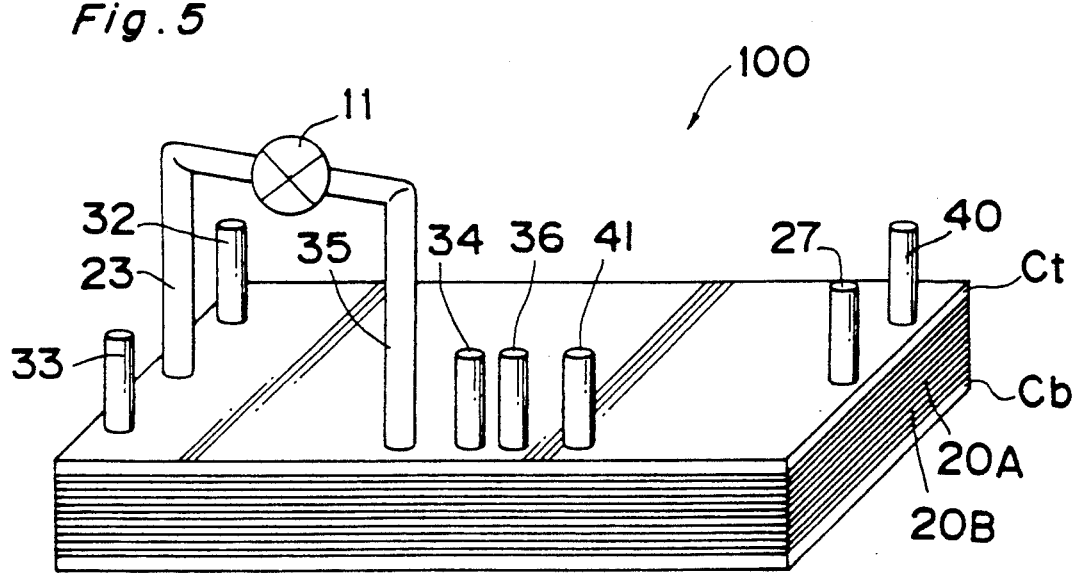
FIG. 5 is a perspective view showing the layer-built heat exchanger built up by the plate components shown in FIGS. 2 and 4.

Referring to FIG. 5, the layer-built heat exchanger 100 in which plural plates 20A and 20B are used in alternating layers between top and bottom cover plates Ct and Cb. In actual use, these plates 20A, 20B, Ct, and Cb are firmly connected to each other in an air-tight manner by any suitable joining means such as a brazing. By layering the plates 20A and 20B, first and second refrigerant inlets 23A and 23B form the refrigerant inlets 23. Similarly, the solution outlet 27, cooling water inlet 32, cooling water outlet 33, refrigerant inlet 34, high pressure refringent outlet 35, poor solution inlet 36, cooling water inlet 40, and cooling water outlet 41 are formed, and such inlets and outlets are shown with fragmental tubes connecting therewith through the top cover Ct.

The chilled water path area 28, the high pressure refrigerant path area 29, the cooling water path area 31 form the evaporator 12, pre-cooler 15, and absorber 17, respectively, as being combined with the refrigerant path area 25.

Furthermore, the third and fourth capillary areas 13A and 13B form the first capillary tubes 13, first and second capillary areas 18A and 18B form the first capillary tubes 18.

In operation, the refrigerant RF depressurized by the expansion valve 11 flows in the refrigerant inlet 23. By layering the plates 20A and 20B, the refrigerant inlet 23 forms the branching path areas 14 in each of the plural individual plates 20B. The refrigerant RF is branched evenly to each of the plates 20B by the refrigerant branching capillary area 13A, and is branched evenly again by the refrigerant branching capillary area 13B to each of the refrigerant fluid paths 25' in each of the plates 20B (the refrigerant RF passes through in the evaporator section 12 and pre-cooler section 15). The refrigerant RF inflowing from the refrigerant branching capillary area 13B flows along the refrigerant paths 25', heat is exchanged with the fluid flowing through the layered plates 20A, the fluid merges again at the end and flows out from the concentrated fluid outlet 27B.

Chilled water CW flows in from the chilled water inlet 32A, and flows out from the water outlet 33A. At this time, the chilled water path 28 functions as an evaporator releasing heat into the refrigerant RF flowing through the absorption fluid paths (refrigerant lines) 25. After exchanging heat with the chilled water CW, the refrigerant RF enters the area of the path 25 connected to the high pressure refrigerant path 29, exchanges heat with the fluid-state high pressure refrigerant RF inflowing from the high pressure refrigerant inlet 34, and is heated more. This heat exchange process improves the degree of sub-cooling of the high pressure refrigerant, and improves the cooling heat quantity obtained as cooling water. The capacity of the heat pump can be increased by this effect. In addition, there are also cases, dependent upon the operating conditions, in which the refrigerant RF is not completely vaporized at the absorption fluid paths 25 connected to the high pressure refrigerant path 29 and contains part fluid, and in this case uneven refrigerant branching occurs with methods which rebranch as in the prior art. However, the refrigerant RF flows evenly in the present invention because there is no merging or branching. Thus, the high pressure refrigerant RF with an increased degree of sub-cooling flows out from the high pressure refrigerant outlet 35A, and flows into the expansion valve 11.

Next, the refrigerant RF flows into the area connected to the poor solution branching path 30 in a heated vapor state. The poor solution flowing in from the poor solution inlet 36A in a low refrigerant vapor concentration is distributed evenly to each of the water coolant path plates 20A by the poor solution branching capillary tubes 18A, and is further distributed to the number of absorption fluid paths 25 by the poor solution branching capillary tubes 18B. It then flows through the through-holes 39 to the absorption solution paths 25, and merges with the refrigerant vapor.

The poor solution fluid RF' is evenly distributed by the poor solution branching capillary tubes 18A and 18B by the same distribution principle that functions with the refrigerant RF. Furthermore, the refrigerant vapor also flows evenly because there is no merging or branching. The poor solution RF' absorbs refrigerant vapor while expending waste heat into the chilled water inflowing from the water inlet 40A and merges at the end, resulting in a concentrated fluid discharged at the rich solution outlet 27B in a completely liquid state. The cooling water CW is discharged from the chilled water outlet 41B.

As described above, a high capacity, high efficiency absorption-heat pump apparatus can be provided by the present invention because the refrigerant and poor solution are evenly branched, the characteristics of the evaporator, pre-cooler, and absorber function effectively, and pressure loss can be reduced.

It is to be noted that the above embodiment uses a layer-built heat exchanger comprising plates with the flow channels formed by etching, but the invention shall not be so limited and a layer-built heat exchanger formed by, for example, a press can also be used.

As will be known from the above description, the present invention offers the benefits of improved capacity and efficiency because it comprises a first refrigerant path of plural flow paths branched at the refrigerant inlet side of the evaporation means, and a high pressure refrigerant path of plural flow paths connecting with each of the flow paths of the low pressure refrigerant path and merging at the refrigerant outlet side of the absorption means.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A heat pump apparatus using a refrigerant as a heat exchanging medium comprising:

refrigerant solution means for producing a poor solution of said refrigerant; and heat exchange means, said heat refrigerant means comprising:

evaporation means for evaporating said refrigerant to produce a refrigerant vapor thereof;

first refrigerant path means provided inside said evaporating means passing therethrough, said first refrigerant path means having an inlet for taking said refrigerant and a predetermined number of first refrigerant paths which are branched from said inlet and extending out said evaporation means for carrying said taken refrigerant and said refrigerant vapor therethrough;

absorption means for making said refrigerant vapor be absorbed into said poor solution; and second refrigerant path means provided inside said absorption means passing therethrough, said second refrigerant path means having said predetermined number of second refrigerant paths including first ends each connected to a branched end of said first refrigerant paths for taking said refrigerant vapor into said absorption means and second ends, and said second refrigerant paths further including an outlet joining said second ends of second refrigerant paths for carrying said refrigerant vapor absorbed poor solution therefrom.

2. A heat pump apparatus as claimed in claim 1, further comprising:

pre-cooler means for sub-cooling said refrigerant provided between said evaporation means and said absorption means; and third refrigerant path means provided inside said pre-cooler means passing therethrough, said third refrigerant path means having said predetermined number of third refrigerant paths including first ends connected to said non-branched ends of first refrigerant paths and second ends connected to non-joined ends of said second refrigerant paths for carrying said refrigerant vapor.

3. A heat pump apparatus using a refrigerant as a heat exchanging medium comprising:

refrigerant solution means for producing a poor solution of said refrigerant; and heat exchange means, said heat exchange means comprising:

evaporation means for evaporating said refrigerant to produce a refrigerant vapor thereof;

first refrigerant path means provided inside said evaporating means passing therethrough, said first refrigerant path means having an inlet for taking said refrigerant and a predetermined number of first refrigerant paths which are branched from said inlet and extending out said evaporation means for carrying said taken refrigerant and said refrigerant vapor therethrough;

pre-cooler means for sub-cooling said refrigerant;

second refrigerant path means provided inside said pre-cooler means passing therethrough, said second refrigerant path means having said predetermined number of second refrigerant paths including first ends each connected to said a branched end of first refrigerant paths; and absorption means for making said refrigerant vapor be absorbed into said poor solution.

4. A heat pump apparatus as claimed in claim 1, further comprising a plurality of first capillary path means provided between said inlet and said branched first refrigerant paths for supplying said refrigerant to said branched first refrigerant paths therethrough, causing a pressure loss of said refrigerant.

5. A heat pump apparatus as claimed in claim 1, further comprising a plurality of second capillary path means connected to said second refrigerant path means for supplying said poor solution to said second refrigerant paths, causing a pressure loss of said poor solution.

6. A heat pump apparatus as claimed in claim 1, wherein said heat exchange means comprises:

a first plate means having first and second flat areas, said first late means comprising:

first channel recess means formed in said first flat area for flowing water therein, said first channel recess means being provided with first inlet through hole means formed adjacent to a portion of said first channel recess means for taking said water thereto, said first channel recess means being provided with first outlet through hole means formed adjacent to a portion of said first channel recess means for carrying out said water from said first channel recess means; and second channel recess formed in said second flat area for flowing water therein, said second channel recess means being provided with second inlet through hole means formed adjacent to a portion of said second channel recess means for taking said water thereto, said second channel recess means being provided with second outlet through hole means formed advanced to a portion of said second channel recess means for carrying out said water from said second channel recess means; and a second plate means having a flat area comprising a plurality of elongated third channel recess means formed said flat area for flowing said refrigerant therein, said third channel recess means being provided with an inlet through hole means formed adjacent to a portion of said third channel recess means for taking said refrigerant thereto, said third channel recess means being provided with an outlet through hole means formed adjacent to a portion of said third channel recess means for carrying out said refrigerant from said third channel recess means, whereby when said first and second plate means are built up to each other, said first and second channel recess means construct said evaporation means and said absorption means in combination with said third channel recess means.

* * * * *

UNITED STATES PATENT AND TRADEMARK OFFICE
CERTIFICATE OF CORRECTION

PATENT NO.   : 5,325,683
DATED        : July 5, 1994
INVENTOR(S)  : Yamamoto et al.

It is certified that error appears in the above-identified patent and that said Letters Patent is hereby corrected as shown below:

column 10, line 29, after "to" delete --said--.

Signed and Sealed this

Eighth Day of November, 1994

Attest:

BRUCE LEHMAN

*Attesting Officer*         *Commissioner of Patents and Trademarks*